United States Patent [19]
Register

[11] Patent Number: 5,465,038
[45] Date of Patent: Nov. 7, 1995

[54] BATTERY CHARGING/DATA TRANSFER APPARATUS FOR A HANDHELD COMPUTER

[75] Inventor: David S. Register, Austin, Tex.

[73] Assignee: Dell USA, L.P., Austin, Tex.

[21] Appl. No.: 158,092

[22] Filed: Nov. 24, 1993

[51] Int. Cl.[6] .................................................. H01M 10/46
[52] U.S. Cl. .................................................. 320/2; 235/375
[58] Field of Search ................................. 320/2; 455/79, 455/89, 90, 346, 348, 349; 235/375

[56] References Cited

U.S. PATENT DOCUMENTS

| | | | |
|---|---|---|---|
| 4,857,716 | 8/1989 | Gombrich et al. | 235/375 X |
| 5,052,943 | 10/1991 | Davis | 320/2 X |
| 5,184,314 | 2/1993 | Kelly et al. | 364/709.01 |
| 5,218,188 | 6/1993 | Hanson | 235/375 |

Primary Examiner—Kristine L. Kincaid
Attorney, Agent, or Firm—J. Richard Konneker; Jeff Hood; James Huffman

[57] ABSTRACT

A battery charging/data transfer structure is provided for use in conjunction with a handheld computer to charge its battery and serve as an infrared data exchange interface between the handheld computer and a data input/output device such as a desktop computer. The structure includes a support housing having an inset well area configured to receive and releasably hold a portion of the handheld computer in a docked orientation. With the handheld computer in this docked orientation a battery charging contact member in the well area contacts a charging area on the received computer portion and transfers battery-charging electrical energy thereto. Additionally, a first I/R data transceiver in the docked computer is optically coupled, via a first interface window structure in the well area and a partially transmissive mirror structure in the housing, to a second I/R data transceiver disposed within the housing and connected to the data input/output device, thereby permitting infrared data exchange in either direction between the input/output device and the docked computer. A second interface window structure on the support housing, in conjunction with the partially transmissive mirror structure, also optically couples the first and second I/R transceivers when the computer is supported in an undocked position in which the first I/R transceiver is appropriately aligned with the second interface window structure.

18 Claims, 3 Drawing Sheets

BATTERY CHARGING/DATA TRANSFER APPARATUS FOR A HANDHELD COMPUTER

BACKGROUND OF THE INVENTION

The present invention relates generally to computer apparatus, and more particularly relates to battery charging and data transfer apparatus for portable, handheld computers.

In an effort to further reduce the size of computer apparatus, various types of handheld computers have been recently proposed. In common with their laptop and notebook counterparts, handheld computers typically are provided with electrical power by means of one or more rechargeable batteries carried by the computer. Accordingly, handheld computers require a convenient means for recharging their batteries. Additionally, handheld computers also require a means of data communication, for both data uploading and downloading purposes.

With respect to the charging of portable computer batteries, a variety of charging stands have been proposed in which the batteries are removed from the computer and placed in a charger structure until recharged and readied for reinstallation in the computer. In the meantime, a spare set of fresh batteries may be installed in the computer.

In the area of data transfer, various types of handheld computers are provided with infrared (I/R) transceiver apparatus which can send and receive data to and from an input/output device, such as a printer or another computer, via a data-carrying infrared light beam. Typically, this data transfer is achieved by pointing the computer transceiver (while holding the computer) at a corresponding I/R transceiver in the I/O device. While this data transfer method is satisfactory for short periods, it becomes a rather tedious and lengthy process when a substantial amount of data needs to be transferred from or to the handheld computer.

From the foregoing it can be seen that it would be desirable to provide improvements in the areas of battery charging and data transfer for handheld computers. It is accordingly an object of the present invention to provide such improvements.

SUMMARY OF THE INVENTION

In carrying out principles of the present invention, in accordance with a preferred embodiment thereof, a specially designed apparatus is provided to serve as a data transfer interface between a handheld computer having a first I/R data transceiver incorporated therein and a data input/output device such as a desktop computer. Preferably, the apparatus provides such a data transfer interface with the handheld computer in either a "docked" or "remote" orientation relative to the apparatus, and comprises a support housing structure having an inset well area therein. The well area is configured to complementarily and releasably receive a portion of the computer and support the computer in its docked orientation.

Coupling means carried by the support housing structure optically couple the first I/R transceiver of the docked computer with a second I/R data transceiver disposed within the housing structure and operatively connectable to the input/output device, and also optically couple the first I/R transceiver to the second I/R transceiver when the computer is in an undocked, remote orientation relative to the housing structure. Representatively, the coupling means include a first I/R interface window structure disposed within the housing well area, a second I/R interface window structure exteriorly carried on the housing structure remote from the well area, and a partially transmissive mirror structure carried within the housing structure between the first I/R interface window structure and the second I/R transceiver.

When the computer is in its docked position, a data-carrying infrared light beam transmitted from either of the two transceivers passes through the mirror structure and the first interface window structure onto the other of the two transceivers. When the computer is in its remote, undocked position a data-carrying infrared light beam transmitted from either of the two transceivers follows an optical path in which the beam is reflected from the mirror structure, before or after passing through the second interface window structure as the case may be, and operatively impinges on the other transceiver.

According to another aspect of the invention the handheld computer is powered by a rechargeable battery, and the apparatus further comprises means for recharging the battery when the computer is in its docked orientation. Thus, the computer may be recharged during lengthy periods of data transfer with the computer in its docked orientation. Representatively, the battery charging means include a battery charging contact member disposed within the housing well area and positioned to operatively engage a corresponding battery charging area on the docked area, and means for transmitting battery charging electrical power to the charging contact member within the well area.

DETAILED DESCRIPTION

Figure 1:
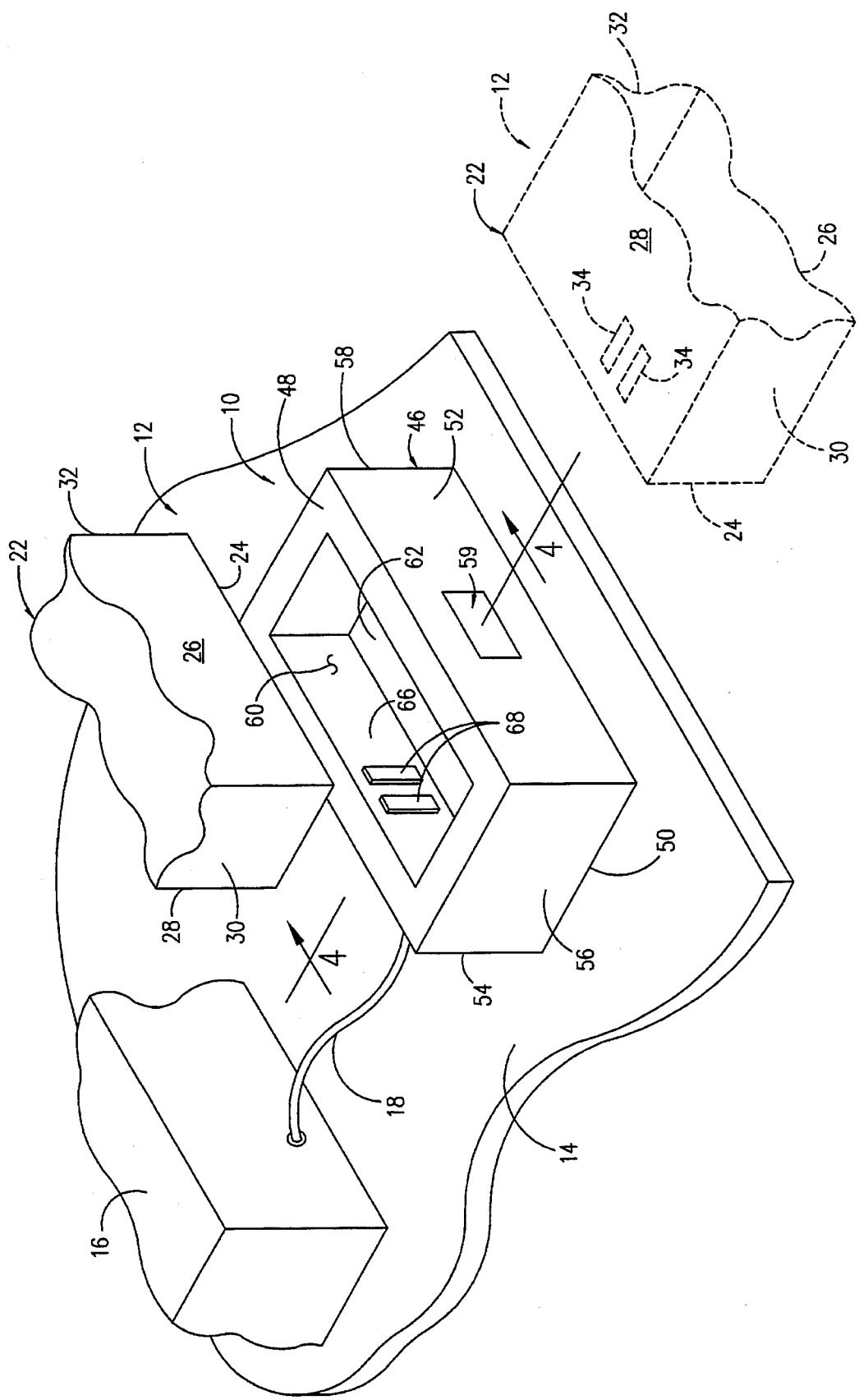
FIG. 1 is a simplified perspective view of a handheld computer battery charging/data transfer structure embodying principles of the present invention and shown being used with a complementarily configured handheld computer.

Perspectively illustrated in FIG. 1 is a specially designed battery charging/data transfer structure 10 that embodies principles of the present invention and is useable in conjunction with a handheld computer 12, a lower end portion of which is shown in both solid and dotted line positions in FIG. 1. The battery charging/data transfer structure 10 is illustrated as resting on a suitable support structure, such as the representative desk top 14, in a spaced apart relationship with a data input/output device, representatively a desktop computer 16. The structure 10 is connected to the I/O device 16 by a data/power interface cable 18 and, as subsequently described herein, is operative to charge a storage battery 20 in the computer 12 (see FIG. 4) in addition to providing a data transfer interface between the I/O device 16 and the handheld computer 12 in either of its solid and dotted line positions.

Figure 2:
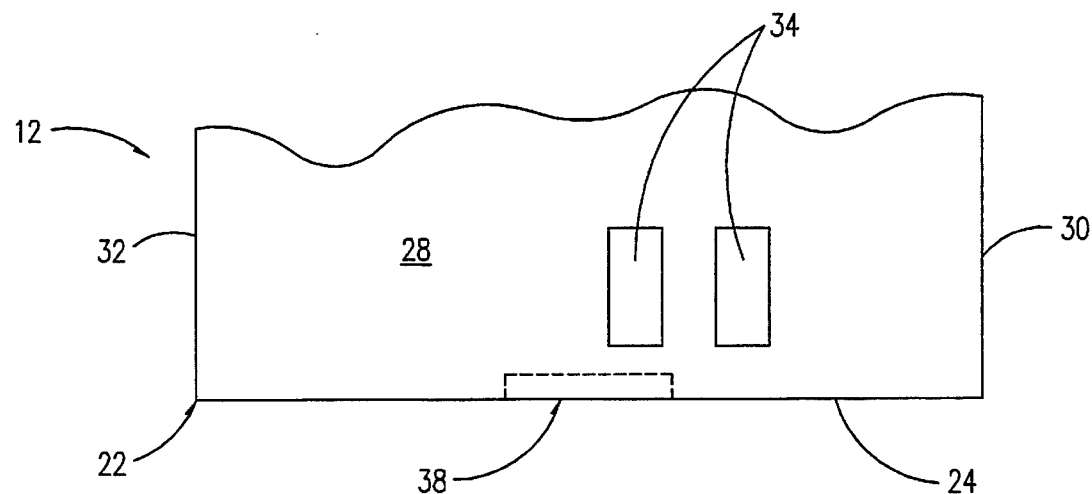
FIG. 2 is a simplified rear side elevational view of the handheld computer of FIG. 1 in its solid line orientation therein.
Figure 3:
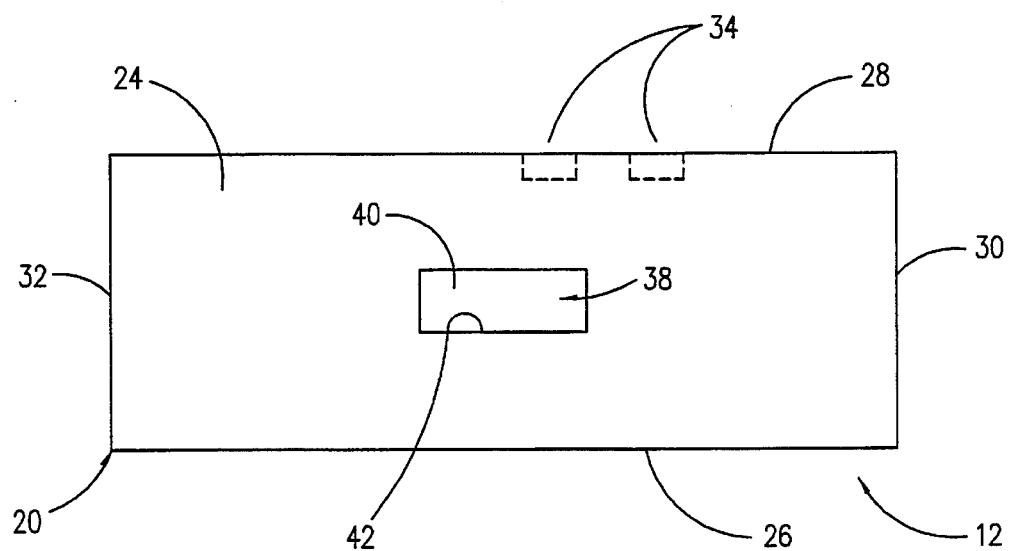
FIG. 3 is a bottom end elevational view of the handheld computer of FIG. 1 in its solid line orientation therein.

Referring now to FIGS. 1–3, the handheld computer 12 has a generally rectangular housing 22 with a bottom end 24, opposite front and rear sides 26 and 28, and opposite left and right sides 30 and 32. A pair of battery charging strips 34 are exposed along the rear side 28 of the housing 22 and are connected to the battery 20 (FIG. 4) by charging lead means 36. An I/R interface window structure 38, through which an infrared beam may be transmitted, is disposed on the bottom end 24 of the housing 22.

Representatively, the window structure 38 comprises a lens 40 disposed in an opening 42 in the bottom end wall 24. However, as will be appreciated, the I/R interface window structure 38 could take a variety of alternate forms, such as a wall opening without the indicated lens, that would permit an I/R beam to be transmitted therethrough. A schematically depicted conventional I/R transceiver 44, comprising the usual LED and phototransistor, is disposed within the computer housing 22 and is operative to transmit and receive an I/R beam through the window structure 38.

Figure 4:
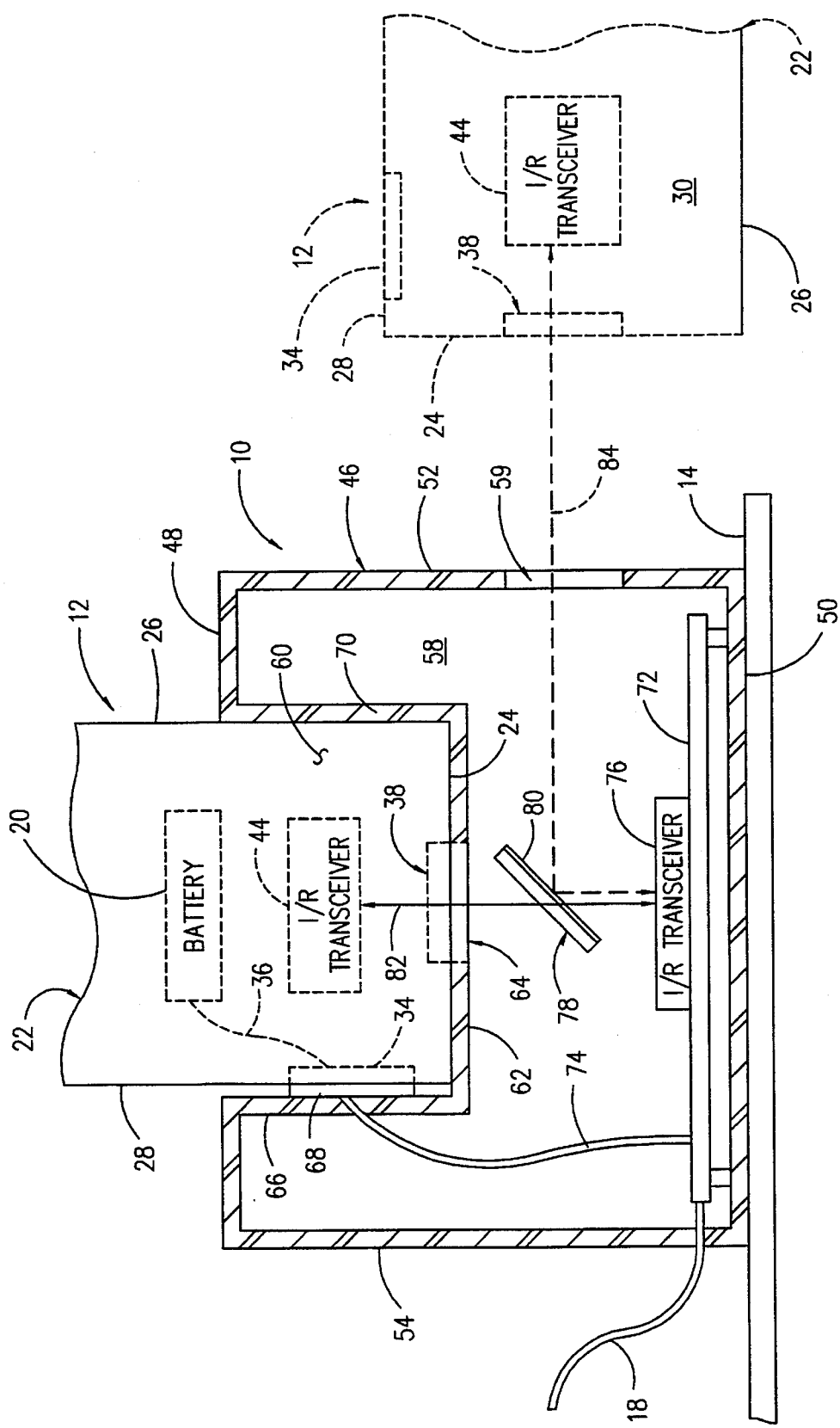
FIG. 4 is an enlarged scale cross-sectional view, taken along line 4—4 of FIG. 1, through the battery charging/data transfer structure, with the handheld computer operatively received therein, and further illustrating the data transfer capabilities of the structure when the computer, in its dotted line orientation, is disposed remotely therefrom.

Referring now to FIGS. 1 and 4, the battery charger/data transfer structure 10 representatively includes a rectangular hollow plastic support housing structure 46 having opposite top and bottom sides 48 and 50, opposite front and rear sides 52 and 54, opposite left and right sides 56 and 58, and an I/R interface window structure 59 disposed on the front side 52 of the housing 46. A rectangular well area 60 extends downwardly through the top side 48 of the housing 46 and is configured to complementarily receive a bottom end portion of the handheld computer 12 as later described. The well 60 has a bottom or inner side wall 62 disposed above the bottom housing wall 50 and having an I/R interface window structure 64 disposed therein, a rear side wall 66 having a pair of battery charging strips 68 thereon, and a front side wall 70.

Interiorly supported on the bottom side of the housing 46 (see FIG. 4) is a main printed circuit board 72 that is operatively connected to the I/O device 16 via the cable 18 which extends through the rear side 54 of the housing 46, and is operatively connected to the battery charging strips 68 by power wiring means 74. An I/R transceiver 76 is mounted on the top side of the circuit board 72, is operatively connected to its circuitry, and is disposed directly beneath the I/R interface window structure 64 on the bottom side of the housing well 60.

For purposes later described, a partially transmissive mirror structure 78 is interposed between the I/R transceiver 76 and the I/R interface window structure 64. The mirror structure 78 is representatively a half-silvered mirror having a silver-coated underside surface 80 that, as viewed in FIG. 4, is upwardly and rightwardly canted (representatively at an angle of approximately 45 degrees).

The battery charger/data transfer structure 10 is useable in conjunction with the handheld computer 12 to provide three functions—(1) the charging of the computer battery, (2) the provision of a docked infrared communications facility, and (3) the provision of a remote infrared communications facility. As illustrated in FIG. 4, the handheld computer 12 may be used in conjunction with the battery charging/data transfer structure 10 in either a docked mode (i.e., with the computer 12 in its solid line position), or in a remote mode (i.e., with the computer 12 in its dotted line position).

With the handheld computer 12 in its docked mode a lower end portion of the computer is complementarily received in the housing well 60, with the battery charging strips 34 on the computer 12 being operatively engaged by the battery charging strips 68 on the back side of the well 60, and the I/R interface window structure 38 on the bottom end 24 of the computer 12 being aligned with the I/R interface window structure 64 on the bottom side of the well 60. In this docked position of the computer 12 its battery 20 may be charged by electrical power sequentially transmitted to its charging strips 34 through the cable 18, the circuit board 72, the cable 74 and the well charging strips 68. Additionally, data may be transferred in either direction between the docked computer 12 and the I/O device 16 via a data-carrying infrared light beam 82 transmitted from one of the I/R transceivers 44, 76 to the other of the I/R transceivers 44, 76 through the partially transmissive mirror structure 78 and the aligned I/R interface window structures 38, 64.

This docked data transfer orientation of the handheld computer 12 is particularly useful in situations where its battery needs charging and/or extended periods of data transfer to or from the computer are contemplated. However, as mentioned above, the battery charging/data transfer structure 10 is also useful in a "remote" mode or aspect in which the computer 12 is hand held (in its dotted line position in FIGS. 1 and 4) or otherwise supported in an undocked orientation in front of the battery charging/data transfer structure 10 with the I/R interface window structures 38 and 59 of the computer 12 and the battery charger/data transfer structure 10 in appropriate alignment with one another.

In this remote, undocked data transfer orientation of the computer 12, a data-carrying infrared light beam 84 may be transmitted from either of the I/R transceivers 44, 76 to the other of the transceivers 44, 76 along the dotted path shown in FIG. 4 in which the beam 84 is reflected from the underside 80 of the mirror structure 78 and passes through the aligned window structures 38, 84. This mode of data transfer between the I/O device 16 and the handheld computer 12 is particularly convenient in situations where only a relatively short time is needed for the required data transfer.

The foregoing detailed description is to be clearly understood as being given by way of illustration and example only, the spirit and scope of the present invention being limited solely by the appended claims.

What is claimed is:

1. Apparatus for facilitating data transfer between a data input/output device, such as a desktop computer, and a handheld computer having incorporated therein first transceiver means for transmitting and receiving a data-carrying infrared light beam, said apparatus comprising:

a support structure configured to releasably receive a portion of the handheld computer and support the handheld computer in a docked orientation, wherein said support structure has an inset well area disposed therein and configured to complementarily and releasably receive said portion of the handheld computer, said inset well area having an inner side wall.

second transceiver means, carried by said support structure and operably connectable to the data input/output device, for transmitting and receiving the data-carrying infrared light beam; and coupling means, carried by said support structure, for optically coupling said first and second transceiver means, when the handheld computer is in said docked orientation thereof, in a manner such that the data carrying infrared light beam transmitted by one of said first and second transceiver means is received by the other of said first and second transceiver means;

wherein said coupling means include an I/R interface window structure disposed in said inner side wall, and wherein said second transceiver means are inwardly spaced apart from said I/R interface window structure in a facing relationship therewith.

2. The apparatus of claim 1 wherein:

the handheld computer is powered by a rechargeable battery therein, and said apparatus further comprises charging means carried by said support structure and operative to charge the battery in response to receipt of said portion of the handheld computer in said inset well area of said support structure.

3. The apparatus of claim 2 wherein:

the handheld computer has an external battery charging contact surface portion, said inset well area has a battery charging contact member disposed on a surface thereof and positioned to engage the external battery charging contact surface portion of the handheld computer when the handheld computer is in said docked orientation thereof, and said apparatus further comprises means for transmitting electrical charging power to said battery charging contact member.

4. Apparatus for facilitating data transfer between a data input/output device, such as a desktop computer, and a handheld computer having incorporated therein first transceiver means for transmitting and receiving a data-carrying infrared light beam, said apparatus comprising:

a housing structure having an external side wall;

second transceiver means, carried within said housing structure and operably connectable to the data input/output device, for transmitting and receiving the data-carrying infrared light beam; and an I/R interface window structure carried on said external side wall of said housing structure and operative to permit the infrared light beam to pass therethrough, for optically coupling said first and second transceiver means, when the handheld computer is supported in a predetermined, spaced apart relationship with said housing structure, in a manner such that the data-carrying infrared light beam transmitted by one of said first and second transceiver means is received by the other of said first and second transceiver means.

5. Apparatus for facilitating data transfer between a data input/output device, such as a desktop computer, and a handheld computer having incorporated therein first transceiver means for transmitting and receiving a data-carrying infrared light beam through a first exterior portion of the handheld computer, said apparatus comprising:

a support structure comprising an inset well area disposed therein and configured to releasably receive a portion of the handheld computer and support the handheld computer in a docked orientation in which said first exterior portion of the handheld computer faces a first portion of said support structure, said inset well area having an inner side wall;

second transceiver means, carried by said support structure and operably connectable to the data input/output device, for transmitting and receiving the data-carrying infrared light beam; and coupling means, carried by said support structure, comprising:

a first I/R interface window structure disposed in said inner side wall in a spaced apart relationship with said second transceiver means, for optically coupling said first and second transceiver means when said handheld computer is in said docked orientation; and a second I/R interface window structure carried on an external wall portion of said support structure in a spaced apart relationship with said second transceiver means and said first I/R interface window structure and operative to permit the infrared light beam to pass therethrough when the handheld computer is in an undocked position in which said first exterior portion thereof faces said second I/R interface window structure.

6. The apparatus of claim 5 wherein said coupling means further include:

a partially transmissive mirror structure disposed within said support structure and operative to create an optical path between said second transceiver means and each of said first and second I/R interface window structures by intercepting the infrared light beam transmitted from said second transceiver means and directing portions of such beam outwardly through each of said first and second I/R interface window structures, and intercepting the infrared light beam passing inwardly through either of said first and second I/R interface window structures and directing a portion of said beam onto said second transceiver means.

7. The apparatus of claim 5 wherein:

the handheld computer is powered by a rechargeable battery therein, and said apparatus further comprises charging means carried by said support structure and operative to charge the battery when the handheld computer is in said docked orientation thereof.

8. The apparatus of claim 7 wherein:

the handheld computer has an external battery charging contact surface portion, said support structure has a battery charging contact member disposed on a surface thereof and positioned to engage the external battery charging contact surface portion of the handheld computer when the handheld computer is in said docked orientation thereof, and said apparatus further comprises means for transmitting electrical charging power to said battery charging contact member.

9. Battery charging/data transfer apparatus for use in providing a data transfer interface between a data input/output device, such as a desktop computer, and a handheld computer having incorporated therein first transceiver means for transmitting and receiving a data-carrying infrared light beam through a first I/R interface window structure disposed in a first exterior portion of the handheld computer, the handheld computer being powered by a rechargeable battery therein and having an external battery charging contact surface portion, said battery charging/data transfer apparatus comprising:

a support housing structure having an inset well area disposed therein and configured to complementarily and releasably receive a portion of the handheld computer, including said first exterior portion thereof, and support the handheld computer in a docked orientation;

a second I/R interface window structure disposed in said inset well area and positioned to be in a facing, aligned relationship with said first I/R interface window structure when the handheld computer is in said docked orientation thereof;

a third I/R interface window structure, disposed on said support housing structure in a spaced apart relationship with said second I/R interface window structure;

second transceiver means, disposed within said support housing structure and operatively connectable to the data input/output device, for transmitting and receiving the data-carrying infrared light beam;

a battery charging contact member disposed on a surface of said inset well area and positioned to engage the external battery charging contact surface portion of the handheld computer when the handheld computer is in said docked orientation thereof;

means for transmitting electrical charging power to said battery charging contact member; and coupling means carried within said support housing, said coupling means being operative to:
(1) optically couple said first and second transceiver means, via said second I/R interface window structure, when the handheld computer is in said docked orientation thereof, in a manner such that a portion of the data-carrying infrared beam transmitted by either of said first and second transceiver means is received by the other of said first and second transceiver means, and
(2) optically couple said first and second transceiver means, via said third I/R interface window structure, when the handheld computer is in an undocked position in which said first and third I/R interface window structures are in an aligned, facing relationship, in a manner such that the data-carrying infrared light beam transmitted by either of said first and second transceiver means is received by the other of said first and second transceiver means.

10. The battery charging/data transfer apparatus of claim 9 wherein said coupling means include a partially transmissive mirror structure interposed between said second transceiver means and said second I/R interface window structure.

11. The battery charging/data transfer apparatus of claim 10 wherein:
said apparatus further comprises a printed circuit board disposed in said support housing structure and having a side surface facing said second I/R interface window structure, a power/data cable operatively connectable between said printed circuit board and said data input/output device, and a battery charging power cable interconnected between said printed circuit board and said battery charging contact member, and
said second transceiver means are disposed on said side surface of said printed circuit board in a facing, spaced apart relationship with said second I/R interface window structure.

12. The battery charging/data transfer apparatus of claim 11 wherein:
said inset well area extends downwardly from a top side portion of said support housing structure,
said second I/R interface window structure is disposed on a bottom side wall portion of said inset well area, and
said third I/R interface window structure is disposed on a vertically extending exterior side wall portion of said support housing structure.

13. The battery charging/data transfer apparatus of claim 9 wherein:
said second and third I/R interface window structures include openings formed in wall portions of said support housing structure.

14. The battery charging/data transfer apparatus of claim 13 wherein:
said second and third I/R interface window structures further include lenses supported in said wall portion openings in said support housing structure.

15. Apparatus for facilitating data transfer between a data input/output device, such as a desktop computer, and a handheld computer having incorporated therein first transceiver means for transmitting and receiving a data-carrying infrared light beam, said apparatus comprising:

a housing structure having an external side wall;

second transceiver means, carried within said housing structure and operably connectable to the data input/output device, for transmitting and receiving the data-carrying infrared light beam; and coupling means, carried by said housing structure, for optically coupling said first and second transceiver means, when the handheld computer is supported in a predetermined, spaced apart relationship with said housing structure, in a manner such that the data-carrying infrared light beam transmitted by one of said first and second transceiver means is received by the other of said first and second transceiver means;

wherein said coupling means include:
said I/R interface window structure carried on external side wall of said housing structure and operative to permit the infrared light beam to pass therethrough, and
reflector means disposed within said housing structure and operative to reflect the infrared light beam from one of said second transceiver means and said I/R interface window structure to the other of said second transceiver means and said I/R interface window structure.

16. Apparatus for facilitating data transfer between a data input/output device, such as a desktop computer, and a handheld computer having incorporated therein first transceiver means for transmitting and receiving a data-carrying infrared light beam through a first exterior portion of the handheld computer, said apparatus comprising:

a support structure configured to releasably receive a portion of the handheld computer and support the handheld computer in a docked orientation in which said first exterior portion of the handheld computer faces a first portion of said support structure;

second transceiver means, carried by said support structure and operably connectable to the data input/output device, for transmitting and receiving the data-carrying infrared light beam; and coupling means, carried by said support structure, for optically coupling said first and second transceiver means when said handheld computer is in said docked orientation and when the handheld computer is in an undocked position in which said first exterior portion thereof faces a second portion of said support structure, said coupling means including:

a first I/R interface window structure disposed in said first portion of said support structure in a spaced apart relationship with said second transceiver means, a second I/R interface window structure disposed in said second portion of said support structure in a spaced apart relationship with said second transceiver means and said first I/R interface window structure; and a partially transmissive mirror structure disposed within said support structure and operative to create an optical path between said second transceiver means and each of said first and second I/R interface window structures by intercepting the infrared light beam transmitted from said second transceiver means and directing portions of said beam outwardly through each of said first and second I/R interface window structures, and intercepting the infrared light beam passing inwardly through either of said first and second I/R interface window structures and directing a portion of said beam onto said second transceiver means.

17. The apparatus of claim 16, wherein:

the handheld computer is powered by a rechargeable battery therein, and said apparatus further comprises charging means carried by said support structure and operative to charge the battery when the handheld computer is in said docked orientation thereof.

18. The apparatus of claim 17, wherein:

the handheld computer has an external battery charging contract surface portion, said support structure has a battery charging contact member disposed on a surface thereof and positioned to engage the external battery charging contact surface portion of the handheld computer when the handheld computer is in said docked orientation thereof, and said apparatus further comprises means for transmitting electrical charging power to said battery charging contact member.

\* \* \* \* \*